(12) United States Patent
Ichida et al.

(10) Patent No.: US 8,655,548 B2
(45) Date of Patent: Feb. 18, 2014

(54) BICYCLE COMPONENT CONTROL APPARATUS

(75) Inventors: Tadashi Ichida, Osaka (JP); Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 293 days.

(21) Appl. No.: 13/076,960

(22) Filed: Mar. 31, 2011

(65) Prior Publication Data

US 2012/0253600 A1 Oct. 4, 2012

(51) Int. Cl.
*B60G 17/018* (2006.01)

(52) U.S. Cl.
USPC ............ 701/37; 701/36; 439/127; 74/473.12

(58) Field of Classification Search
USPC ............... 74/473.12, 335; 200/61.88, 466; 701/37; 439/127, 606, 851, 605; 280/288, 288.4, 283, 5.5, 210; 224/419; 705/37; 180/206.2, 65.1, 220; 340/432, 636.1; 474/70; 310/75 C
See application file for complete search history.

(56) References Cited

U.S. PATENT DOCUMENTS

| | | | |
|---|---|---|---|
| 5,971,116 A | 10/1999 | Franklin | |
| 6,026,939 A | 2/2000 | Girvin et al. | |
| 6,684,970 B2 * | 2/2004 | Gotou | 180/65.225 |
| 7,874,567 B2 | 1/2011 | Ichida et al. | |
| 8,429,061 B2 * | 4/2013 | Shirai | 705/37 |
| 8,458,080 B2 * | 6/2013 | Shirai | 705/37 |
| 2004/0021431 A1 | 2/2004 | Bruwer et al. | |
| 2006/0211282 A1 * | 9/2006 | Onogi et al. | 439/127 |
| 2007/0000343 A1 * | 1/2007 | Ueno | 74/473.12 |
| 2009/0192673 A1 | 7/2009 | Song et al. | |
| 2010/0010709 A1 | 1/2010 | Song | |
| 2012/0253598 A1 * | 10/2012 | Shirai | 701/37 |
| 2012/0253599 A1 * | 10/2012 | Shirai | 701/37 |

FOREIGN PATENT DOCUMENTS

| | | |
|---|---|---|
| EP | 1 568 922 A2 | 8/2005 |
| FR | 2 865 994 | 8/2005 |
| JP | 1-145215 A | 6/1989 |
| JP | 2000-62664 A | 2/2000 |
| JP | 2003-312570 A | 11/2003 |
| JP | 2005-132275 A | 5/2005 |
| WO | WO 99/59860 A1 | 11/1999 |

OTHER PUBLICATIONS

European Search Report of corresponding EP Application No. 12 16 0716.2 dated Jul. 31, 2012.

* cited by examiner

*Primary Examiner* — Behrang Badii (74) *Attorney, Agent, or Firm* — Global IP Counselors (57) ABSTRACT

A bicycle component control apparatus is basically provided with a controller and a detecting member. The controller is configured to control an operation of an electrical bicycle component by selectively outputting a control parameter. The detecting member detects an electrical connecting state between the controller and a manually operated input member for changing a setting of the electrical bicycle component. The controller outputs a predetermined control parameter based on the electrical connecting state.

13 Claims, 9 Drawing Sheets

BICYCLE COMPONENT CONTROL APPARATUS

BACKGROUND

1. Field of the Invention

This invention generally relates to a control apparatus that is configured to control a bicycle component. More specifically, the present invention relates to a bicycle component control apparatus for controlling an electrically adjustable component.

2. Background Information

In recent years, some bicycles are provided with electrically adjustable components. Examples of some these electrically adjustable components include suspensions, derailleurs and a seatpost. Often these electrically adjustable components are provided with an electric unit that includes such parts as a motor or other drive device for adjusting the electrically adjustable component and a position sensor for detecting a position of the electrically adjustable component. Typically, bicycles equipped with electrically adjustable components are also provided with an electrical power supply such as a battery or a generator for supply electrical energy to the electrically adjustable components.

One example of a conventional bicycle electrical system is disclosed in Japanese Laid-Open Patent Publication No. 2003-312750. The conventional bicycle electrical system of this publication has two electric components connected with an electric power communication line. This conventional bicycle electrical system also has a control unit provided on a front derailleur and an operating unit provided on a handlebar. This conventional bicycle electrical system uses an electric power line communication technology to connect the control unit and the operating unit through the electric power line. Other electric components are connected to the control unit with signal lines.

SUMMARY

In view of the state of the known technology, a bicycle component control apparatus is disclosed herein that outputs a predetermined control parameter based on the electrical connecting state between an input device and a controller that controls one or more electrical bicycle components.

In one embodiment, a bicycle component control apparatus is provided that basically comprises a controller and a detecting member. The controller is configured to control an operation of an electrical bicycle component by selectively outputting a control parameter. The detecting member detects an electrical connecting state between the controller and a manually operated input member for changing a setting of the electrical bicycle component. The controller outputs a predetermined control parameter based on the electrical connecting state.

These and other objects, features, aspects and advantages of the bicycle component control apparatus will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
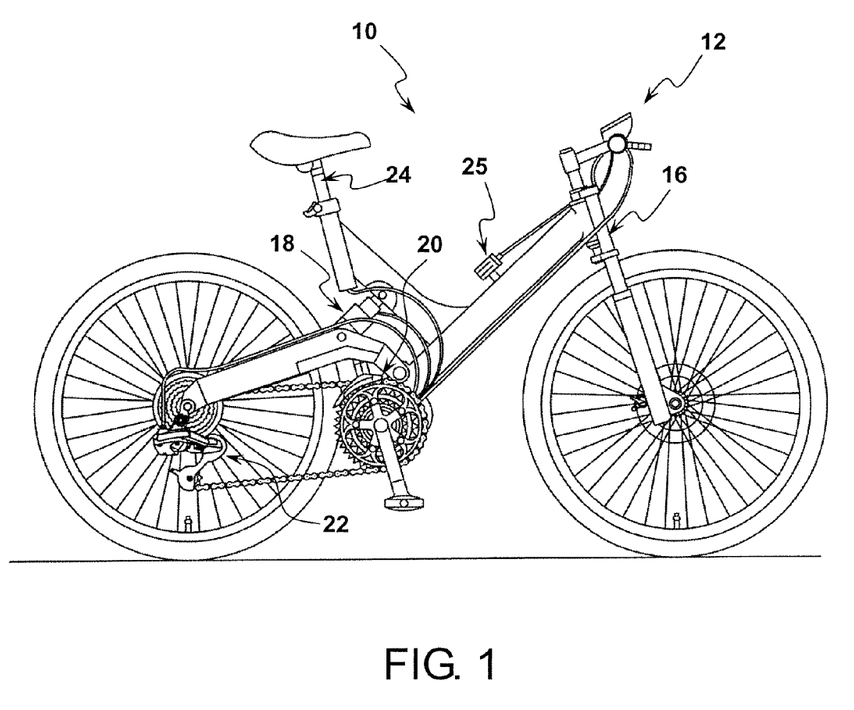
FIG. 1 is a side elevational view of a bicycle that is equipped with a bicycle component control apparatus in accordance with one embodiment.

Referring initially to FIG. 1, a bicycle 10 is illustrated that is equipped with a bicycle component control apparatus 12 for controlling the operations of various electrical bicycle components in accordance with one illustrated embodiment. In the illustrated embodiment, the bicycle component control apparatus 12 is provided with a control unit 14 mounted on a handlebar 15, an electrically adjustable front suspension 16, an electrically adjustable rear suspension 18, an electrically operated front derailleur 20, an electrically operated rear derailleur 22 and an electrically operated seatpost 24. The front suspension 16, the rear suspension 18, the front derailleur 20, the rear derailleur 22 and the seatpost 24 constitute examples of electrical bicycle components that are at least partially controlled by the control unit 14 based on an operation of one or more manually operated input members or devices as discussed below. Thus, the front suspension 16, the rear suspension 18, the front derailleur 20, the rear derailleur 22 and the seatpost 24 will be collectively referred to as the electrical bicycle components 16, 18, 20, 22 and 24 for the sake of convenience. However, the bicycle component control apparatus 12 is not limited to the electrical bicycle components 16, 18, 20, 22 and 24 described and illustrated herein. Rather, the bicycle component control apparatus 12 can have only one of the components 16, 18, 20, 22 and 24, or any combination of the electrical bicycle components 16, 18, 20, 22 and 24 as well as other electrical bicycle components (not shown) as needed and/or desired. In any event, in the illustrated embodiment, the control unit 14 is configured to control an operation of each of the electrical bicycle components 16, 18, 20, 22 and 24 by selectively outputting a control parameter to the electrical bicycle components 16, 18, 20, 22 and 24 for selectively controlling an operating state of the electrical bicycle components 16, 18, 20, 22 and 24, as discussed below.

Figure 3:
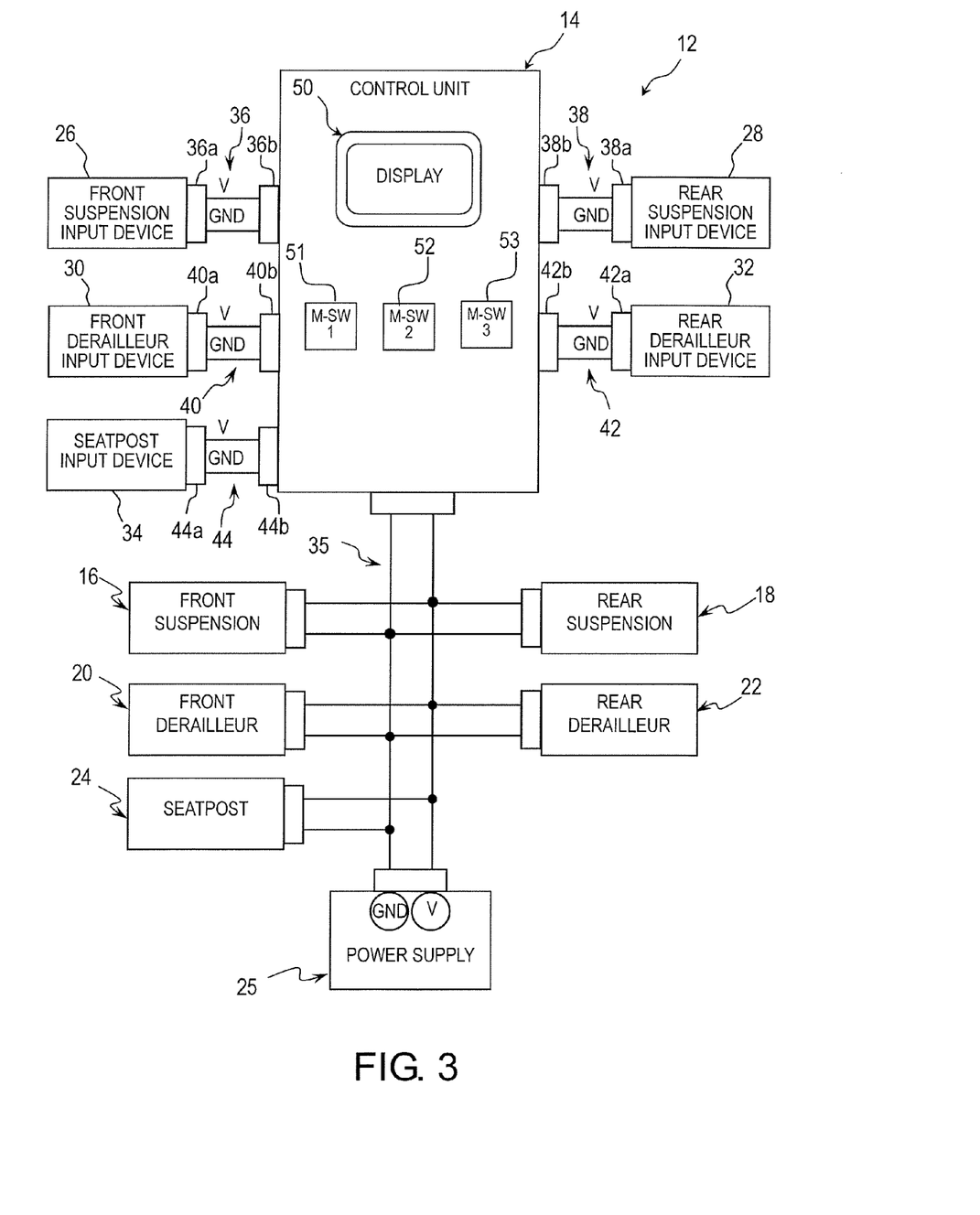
FIG. 3 is a schematic block diagram showing an entire configuration of the bicycle component control apparatus.

As seen in FIGS. 1 and 3, the bicycle component control apparatus 12 is also provided with a power supply 25 (e.g., a battery as shown) for supplying electrical power to the control unit 14 and the electrical bicycle components 16, 18, 20, 22 and 24. In other words, the power supply 25 constitutes an electrical energy storage device or storage element that serves as a power source for the electrical components of the bicycle 10. The power supply 25 is not limited to a battery as the power supply. Rather, for example, a generator by itself or a generator in conjunction with a battery can be used for the power supply of the control unit 14 and the electrical bicycle components 16, 18, 20, 22 and 24. The power supply 25 is a battery in the illustrated embodiment. The battery of the power supply 25 can be, for example, a nickel hydrogen battery or a lithium ion battery. For example, the power supply 25 preferably supplies a power supply voltage V of about V1 volts (DC) to the control unit 14 and the electrical bicycle components 16, 18, 20, 22 and 24.

Figure 2:
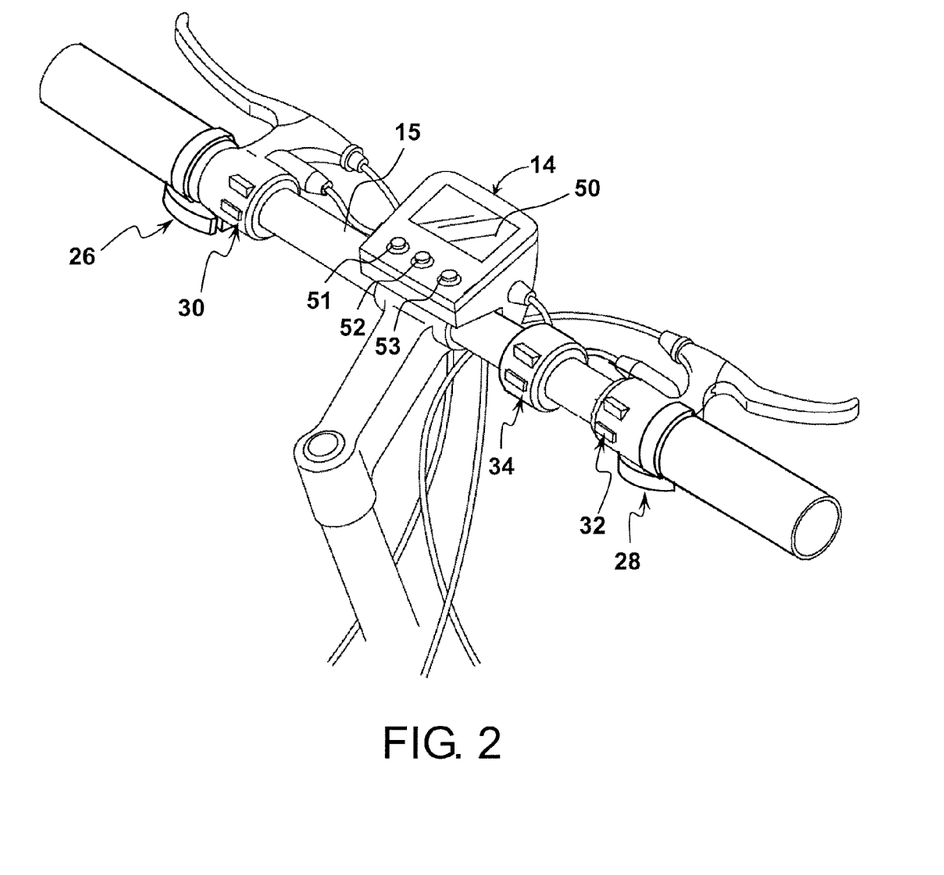
FIG. 2 is a perspective view of the handlebar area of the bicycle illustrated in FIG. 1, with a control unit and a plurality of operating or input devices mounted to a straight type handlebar.

Referring to FIGS. 2 and 3, the bicycle component control apparatus 12 is further provided with a front suspension input device 26, a rear suspension input device 28, a front derailleur input device 30, a rear derailleur input device 32 and a seatpost input device 34. In the first illustrated embodiment, the input devices 26, 28, 30, 32 and 34 are mounted on the handlebar 15 of the bicycle 10. The input devices 26, 28, 30, 32 and 34 constitute examples of manually operated input members or devices in the form of switches. While the switches or input devices 26 and 28 are illustrated as being used to operate the front and rear suspensions 16 and 18, it will be apparent from this disclosure that the input devices 26 and 28 can be configured to operate one of the other electrical bicycle components 20, 22 and 24. For example, the input device 26 can be used to operate the front derailleur 20, the rear derailleur 22, or the seatpost 24 as needed and/or desired.

The input devices 26, 28, 30, 32 and 34 are each operatively coupled to the control unit 14. Each of the input devices 26, 28, 30, 32 and 34 selectively outputs an input signal to the control unit 14 to change a setting of the electrical bicycle components 16, 18, 20, 22 and 24 in accordance with a control parameter that is outputted by the control unit 14, as discussed below. The term "signal" as used herein is not limited to an electrical signal, but includes other types of signals such as a command.

As explained below in more detail, the bicycle component control apparatus 12 is configured such that various setting states of the electrical bicycle components 16, 18, 20, 22 and 24 are selectively changed in response to a manual input from a rider or an automatic input from a control program. In other words, the bicycle component control apparatus 12 selectively changes at least one electrically adjustable suspension parameter of each of the electrical bicycle components 16, 18, 20, 22 and 24 either manually or automatically. Also, as discussed below, when one of the input devices 26, 28, 30, 32 and 34 becomes disconnected or otherwise stop communicating, the bicycle component control apparatus 12 automatically controls a corresponding one of the bicycle components 16, 18, 20, 22 and 24 to a prescribed state.

The power supply 25 is electrically coupled to the control unit 14 and the electrical bicycle components 16, 18, 20, 22 and 24 via an electric power line 35. The power line 35 is a two conductor wiring harness having a ground wire GND and a power or voltage wire V with branches to the electrical bicycle components 16, 18, 20, 22 and 24. The power line 35 preferably has detachable type plug-in connectors for detachably connecting the power line 35 to the control unit 14 and the electrical bicycle components 16, 18, 20, 22 and 24 in a reattachable manner. In the illustrated embodiment, power is supplied from the power supply 25 to the input devices 26, 28, 30, 32 and 34 through the control unit 14 as explained below.

In this embodiment, the front suspension 16 includes a pair of combination air-oil operated shock absorbers with various adjustment elements. Preferably, the front suspension 16 includes an adjustment element for low speed and high speed compression damping, an adjustment element for stroke (piston travel or compression chamber volume), an adjustment element for air chamber pressure, for rebound damping, an adjustment element for lockout actuation, and an adjustment element for lockout force adjustment. Examples of such parameter adjustments may be found in current shock absorbers sold by suspension manufacturers. Since numerous types of conventional front suspensions can be utilized for the front suspension 16, the structure of the front suspension 16 will not be discussed and/or illustrated in detail. The front suspension 16 is manually operated by the front suspension input device 26 for controlling a state (e.g., lockout/non-lockout, travel-stroke length and/or damping rate) of the front suspension 16.

In this embodiment, the rear suspension 18 includes a combination air-oil operated shock absorber with a typical external spring (not shown in the drawings). The rear suspension 18 includes various adjustment elements. Preferably, the rear suspension 18 includes an adjustment element for spring preload, an adjustment element for low speed and high speed compression damping, an adjustment element for air chamber pressure adjustment, an adjustment element for air chamber volume adjustment, an adjustment element for rebound damping, an adjustment element for lockout actuation, and an adjustment element for lockout force adjustment. Examples of such parameter adjustments may be found in current shock absorbers sold by suspension manufacturers. Since numerous types of conventional rear suspensions can be utilized for the rear suspension 18, the structure of the rear suspension 18 will not be discussed and/or illustrated in detail. The rear suspension 18 is manually operated by the rear suspension input device 28 for controlling a state (e.g., lockout/non-lockout, travel-stroke length and/or damping rate) of the rear suspension 18.

In this embodiment, the front derailleur 20 is an electrically operated device that laterally shifts a chain between front sprockets. Since numerous types of conventional front derailleurs can be utilized for the front derailleur 20, the structure of the front derailleur 20 will not be discussed and/or illustrated in detail. The front derailleur 20 is manually operated by the front derailleur input device 30 for controlling a state (e.g., shift position) of the front derailleur 20.

In this embodiment, the rear derailleur 22 is an electrically operated device that laterally shifts a chain between rear sprockets. Since numerous types of conventional rear derailleurs can be utilized for the rear derailleur 22, the structure of the rear derailleur 22 will not be discussed and/or illustrated in detail. The rear derailleur 22 is manually operated by the rear derailleur input device 32 for controlling a state (e.g., shift position) of the rear derailleur 22.

In this embodiment, the seatpost 24 is an electrically operated device that moves a bicycle seat in a parallel direction with respect to a center axis of the seat tube. Since numerous types of extendible seatpost can be utilized for the seatpost 24, the structure of the seatpost 24 will not be discussed and/or illustrated in detail. The seatpost 24 is manually operated by a seatpost input device 34 for controlling a state (e.g., height or length) of the seatpost 34

In the illustrated embodiment of FIG. 3, the input devices 26, 28, 30, 32 and 34 are detachably connected to the control unit 14 as discussed below. When one of the input devices 26, 28, 30, 32 and 34 is detached from the control unit 14, the control unit 14 cannot change the state of the electrical bicycle components 16, 18, 20, 22 and 24 based on the operation of the input devices 26, 28, 30, 32 and 34 that has been detached. Thus, the rider can no longer manually control the state of the electrical bicycle components that is disconnected from the control unit 14. In this situation, the state of the electrical bicycle components 16, 18, 20, 22 and 24 may be trapped in an undesirable operating state for the rider. For example, it is usually more desirable for a rider to have a bicycle suspension in a non-lockout state rather than in stuck in a lockout state. For this reason, upon determining the electrical connecting state between the control unit 14 and one of the input devices 26, 28, 30, 32 and 34 is in a non-normal state (i.e., a non-electrical connecting state), the control unit 14 will automatically output a predetermined control parameter to the electrical bicycle components 16, 18, 20, 22 and 24 that corresponds to the input device in the non-normal state. In other words, the control unit 14 outputs a predetermined control parameter when the electrical connecting state between the control unit 14 and one of the input devices 26, 28, 30, 32 and 34 is indicative of a non-normal state. This predetermined control parameter from the control unit 14 controls the electrical bicycle component, whose input device is in the non-normal state, to a more desirable predetermined state, if the electrical bicycle component is not already in the more desirable predetermined state. As will be apparent from this disclosure, the non-normal state between the control unit 14 and one of the input devices 26, 28, 30, 32 and 34 is not limited to an electrical wire from being detached, but can include any situation in which the operation of the input device cannot communicated to the controller of the electrical bicycle component that is operated by that input device. Thus, the term "non-normal state" refers to a state in which the operation of the input device cannot communicated to the controller of the electrical bicycle component that is operated by that input device.

In the illustrated embodiment of FIG. 3, the front suspension input device 26 is detachably connected to the control unit 14 by an electric power line 36 having a first plug-in connector 36a and a second plug-in connector 36b. Preferably, the power line 36 is a two conductor wire having a ground wire GND and a power or voltage wire V. The first plug-in connector 36a is detachably connected to the control unit 14 in a reattachable manner. The second plug-in connector 36b is detachably connected to the front suspension input device 26 in a reattachable manner. In the case that communication (i.e., the electrical connecting state) between the front suspension input device 26 and the control unit 14 is interrupted, the control unit 14 will automatically set the front suspension 16 to one or more predetermined controlled states, e.g., a non-lockout state, a middle travel-stroke length state and/or a middle damping rate state. For example, when the front suspension 16 is in a lockout state, the control unit 14 can be automatically set the front suspension 16 to a non-lockout state in response to a determination that the electrical connecting state between the front suspension input device 26 and the control unit 14 is in a non-normal state. When the front suspension 16 is in either a high travel-stroke length state or a low travel-stroke length state, the control unit 14 can be automatically set the front suspension 16 to a middle travel-stroke length state in response to a determination that the electrical connecting state between the front suspension input device 26 and the control unit 14 is in a non-normal state. When the front suspension 16 is in high or low damping rate state, the control unit 14 can be automatically set the front suspension 16 to a middle damping rate state in response to a determination that the electrical connecting state between the front suspension input device 26 and the control unit 14 is in a non-normal state. These states of the front suspension 16 are preferably factory default settings that can be manually overridden by the rider as needed and/or desired. Thus, the rider can manually set a predetermined control parameter that is output by the control unit 14 to attain desired default states of the front suspension 16. In other words, the control unit 14 is configured to automatically set at least one of a non-lock out state, a default travel-stroke length state and a default damping rate state of the front suspension 16, as selected by the rider or at the factory, by selectively outputting a corresponding the control parameter. Moreover, depending on the configuration of the front suspension 16, only one or some of these states can be controlled by the control unit 14.

In the illustrated embodiment of FIG. 3, the rear suspension input device 28 is detachably connected to the control unit 14 by an electric power line 38 having a first plug-in connector 38a and a second plug-in connector 38b. Preferably, the power line 38 is a two conductor wire having a ground wire GND and a power or voltage wire V. The first plug-in connector 38a is detachably connected to the control unit 14 in a reattachable manner. The second plug-in connector 38b is detachably connected to the rear suspension input device 28 in a reattachable manner. In the case that communication (i.e., the electrical connecting state) between the rear suspension input device 28 and the control unit 14 is interrupted, the control unit 14 will automatically set the rear suspension 18 to one or more predetermined controlled states, e.g., a non-lockout state, a middle travel-stroke length state and/or a middle damping rate state. For example, when the rear suspension 18 is in a lockout state, the control unit 14 can be automatically set the rear suspension 18 to a non-lockout state in response to a determination that the electrical connecting state between the rear suspension input device 28 and the control unit 14 is in a non-normal state. When the rear suspension 18 is in either a high travel-stroke length state or a low travel-stroke length state, the control unit 14 can be automatically set the rear suspension 18 to a middle travel-stroke length state in response to a determination that the electrical connecting state between the rear suspension input device 28 and the control unit 14 is in a non-normal state. When the rear suspension 18 is in high or low damping rate state, the control unit 14 can be automatically set the rear suspension 18 to a middle damping rate state in response to a determination that the electrical connecting state between the rear suspension input device 28 and the control unit 14 is in a non-normal state. These states of the rear suspension 18 are preferably factory default settings that can be manually overridden by the rider as needed and/or desired. Thus, the rider can manually set a predetermined control parameter that is output by the control unit 14 to attain desired default states of the rear suspension 18. In other words, the control unit 14 is configured to automatically set at least one of a non-lock out state, a default travel-stroke length state and a default damping rate state of the rear suspension 18, as selected by the rider or at the factory, by selectively outputting a corresponding the control parameter. Moreover, depending on the configuration of the rear suspension 18, only one or some of these states can be controlled by the control unit 14.

In the illustrated embodiment of FIG. 3, the front derailleur input device 30 is detachably connected to the control unit 14 by an electric power line 40 having a first plug-in connector 40a and a second plug-in connector 40b. Preferably, the power line 40 is a two conductor wire having a ground wire GND and a power or voltage wire V. The first plug-in connector 40a is detachably connected to the control unit 14 in a reattachable manner. The second plug-in connector 40b is detachably connected to the front derailleur input device 30 in a reattachable manner. In the case that communication (i.e., the electrical connecting state) between the front derailleur input device 30 and the control unit 14 is interrupted, the control unit 14 will automatically set the front derailleur 20 to one or more predetermined controlled states, e.g., a default gear position. For example, when the front derailleur 20 is in a gear position other than the middle gear position, the control unit 14 will automatically set the front derailleur 20 to a middle gear position as a default state in response to a determination that the electrical connecting state between the front derailleur input device 30 and the control unit 14 is in a non-normal state. The default state or default gear position of the front derailleur 20 is preferably a factory default setting that can be manually overridden by the rider as needed and/or desired. Alternatively, any gear position of the front derailleur 20 can be set as default gear position of the front derailleur 20 as needed and/or desired. For example, if the front derailleur 20 only has two gear positions, the default gear position of the front derailleur 20 can be set to the top gear position or the low gear position as needed and/or desired. Thus, the rider can manually set a predetermined control parameter that is output by the control unit 14 to attain desired default state of the front derailleur 20. In this way, the control unit 14 is configured to automatically set a default gear position of the front derailleur 20, as selected by the rider or at the factory, by selectively outputting a corresponding the control parameter.

In the illustrated embodiment of FIG. 3, the rear derailleur input device 32 is detachably connected to the control unit 14 by an electric power line 42 having a first plug-in connector 42a and a second plug-in connector 42b. Preferably, the power line 42 is a two conductor wire having a ground wire GND and a power or voltage wire V. The first plug-in connector 42a is detachably connected to the control unit 14 in a reattachable manner. The second plug-in connector 42b is detachably connected to the rear derailleur input device 32 in a reattachable manner. In the case that communication (i.e., the electrical connecting state) between the rear derailleur input device 32 and the control unit 14 is interrupted, the control unit 14 will automatically set the rear derailleur 22 to one or more predetermined controlled states, e.g., a default gear position. For example, when the rear derailleur 22 is in a gear position other than the middle gear position, the control unit 14 will automatically set the rear derailleur 22 to a middle gear position as a default state in response to a determination that the electrical connecting state between the rear derailleur input device 32 and the control unit 14 is in a non-normal state. The default state or default gear position of the rear derailleur 22 is preferably a factory default setting that can be manually overridden by the rider as needed and/or desired. Alternatively, any gear position of the rear derailleur 22 can be set as default gear position of the rear derailleur 22 as needed and/or desired. Thus, the rider can manually set a predetermined control parameter that is output by the control unit 14 to attain desired default state of the rear derailleur 22. In this way, the control unit 14 is configured to automatically set a default gear position of the rear derailleur 22, as selected by the rider or at the factory, by selectively outputting a corresponding control parameter.

In the illustrated embodiment of FIG. 3, the seatpost input device 34 is detachably connected to the control unit 14 by an electric power line 44 having a first plug-in connector 44a and a second plug-in connector 44b. Preferably, the power line 44 is a two conductor wire having a ground wire GND and a power or voltage wire V. The first plug-in connector 44a is detachably connected to the control unit 14 in a reattachable manner. The second plug-in connector 44b is detachably connected to the seatpost input device 34 in a reattachable manner. In the case that communication (i.e., the electrical connecting state) between the seatpost input device 34 and the control unit 14 is interrupted, the control unit 14 will automatically set the seatpost 24 to one or more predetermined controlled states, e.g., a default height position. For example, when the seatpost 24 is in any height position other than the middle height position, the control unit 14 will automatically set the seatpost 24 to the middle height position as a default state in response to a determination that the electrical connecting state between the seatpost input device 34 and the control unit 14 is in a non-normal state. The default state or default height position of the seatpost 24 is preferably a factory default setting that can be manually overridden by the rider as needed and/or desired. Alternatively, any height position of the seatpost 24 can be set as default height position of the seatpost 24 as needed and/or desired. Thus, the rider can manually set a predetermined control parameter that is output by the control unit 14 to attain desired default state of the seatpost 24. In this way, the control unit 14 is configured to automatically set a default height position of the seatpost 24, as selected by the rider or at the factory, by selectively outputting a corresponding the control parameter.

Figure 4:
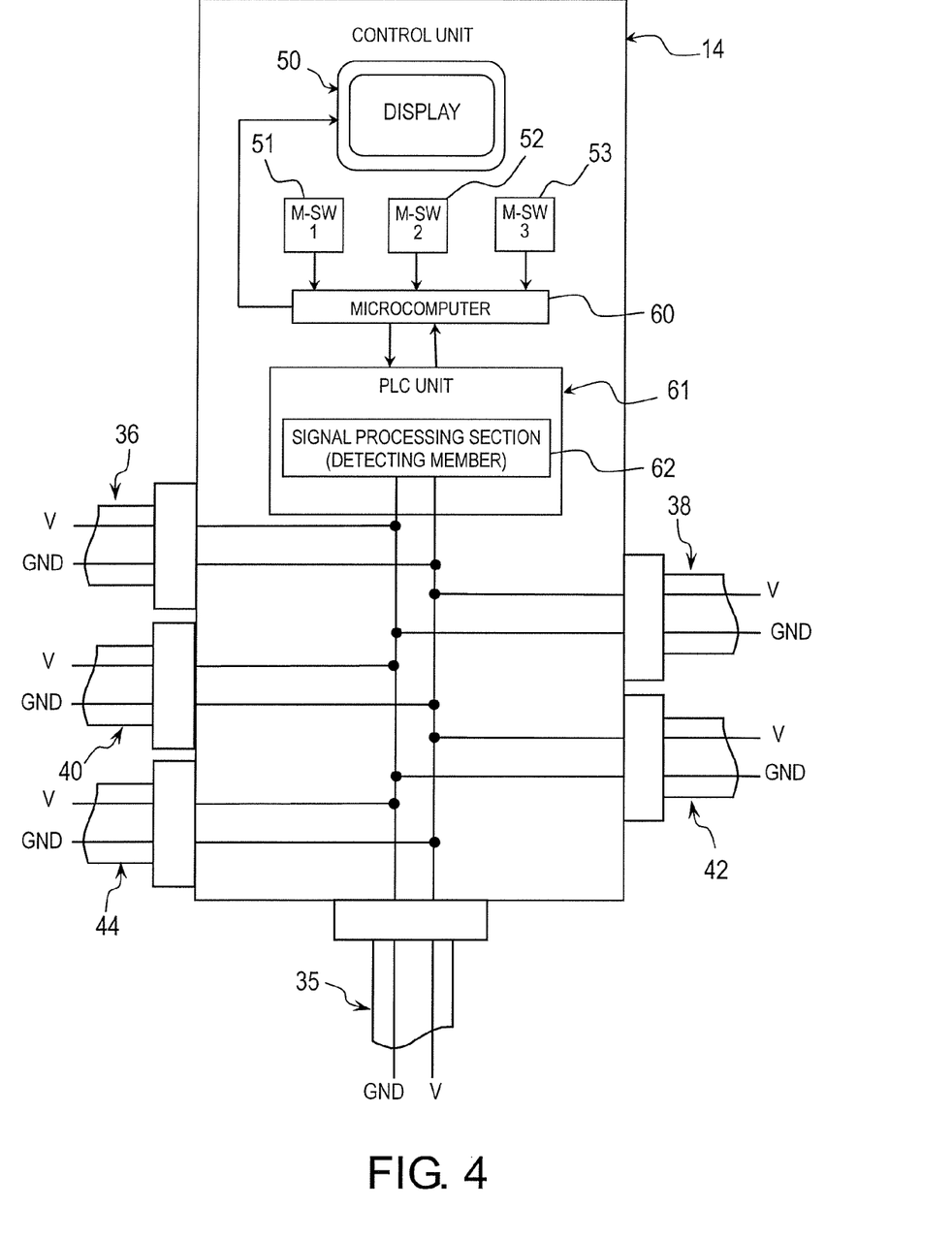
FIG. 4 is a schematic block diagram showing a basic configuration of the control unit of the bicycle component control apparatus.

Referring now to FIG. 4, a schematic block diagram is illustrated that shows a basic configuration of the bicycle component control apparatus 12. The control unit 14 is provided with an integrated display 50 and three mode switches 51, 52 and 53 for controlling various modes of one or more of the input devices 26, 28, 30, 32 and 34. In other words, the mode switches 51, 52 and 53 are electrically connected to the control unit 14 for controlling operation modes of control unit 14 and operation modes of the input devices 26, 28, 30, 32 and 34. By using one or more of the mode switches 51, 52 and 53, the user can selectively change which of the electrically adjustable parameters are controlled by the input devices 26, 28, 30, 32 and 34. While the mode switches 51, 52 and 53 are illustrated as being integrated with the housing of the control unit 14, one or more of the mode switches 51, 52 and 53 can be remotely located from the control unit 14. Also the display 50 can be part of the control unit 14, as illustrated, or can be a separate member that is electrically connected to the control unit 14. Using the mode switches 51, 52 and 53, the rider can change how the input devices 26, 28, 30, 32 and 34. For example, the input devices 26 and 28 can be switched between a lock out state adjustment mode, a travel-stroke length state adjustment mode and a damping rate state adjustment mode. Thus, the control unit 14 is configured to selectively change various setting states of the electrical bicycle components 16, 18, 20, 22 and 24 in response to a manual input from a rider of the input devices 26, 28, 30, 32 and 34 or an automatic input from a control program in the control unit 14. In other words, the control unit 14 is configured to selectively change at least one electrically adjustable parameter of each of the electrical bicycle components 16, 18, 20, 22 and 24 either manually or automatically.

Figure 9:
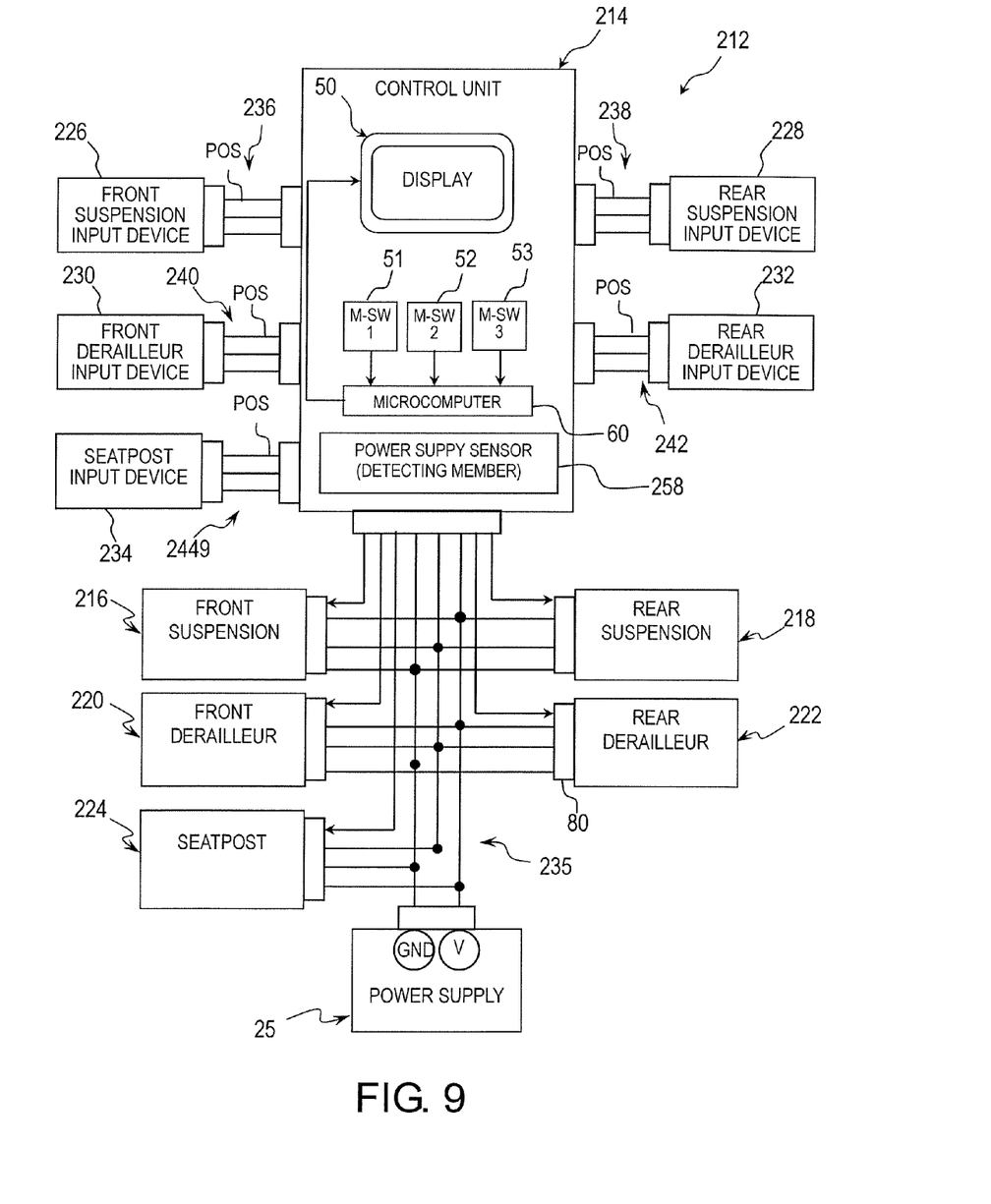
FIG. 9 is another alternative schematic block diagram showing an entire configuration of another alternative bicycle component control apparatus.

Still referring to FIG. 4, the control unit 14 is also provided with a main microcomputer 60 and a power line communication (PLC) unit 61 that includes a signal processing section 62. The power line communication unit 61 is connected to the power supply 25 for receiving electric power. The power line communication unit 61 is part of a power line communication (PLC) system that is configured to execute two-way communications with each of the electrical bicycle components 16, 18, 20, 22 and 24, the power supply 25, and each of the input devices 26, 28, 30, 32 and 34 through the power lines 35, 36, 38, 40, 42 and 44. Thus, control signals or commands that control the electrical bicycle components 16, 18, 20, 22 and 24 are superimposed on the power source voltage flowing in the electric power lines 35, 36, 38, 40, 42 and 44 that interconnect the control unit 14, the electrical bicycle components 16, 18, 20, 22 and 24, the power supply 25 and the input devices 26, 28, 30, 32 and 34. In this way, data can be transmitted between the control unit 14 and the electrical bicycle components 16, 18, 20, 22 and 24 and the power supply 25 by the electric power line 35. Optionally, instead of using power line communications (PLC), in addition to a ground wire GND and a voltage wire V, separate signal wires can be provided for transmitting data as needed and/or desired as seen in FIG. 9.

In any event, in this first embodiment, the control unit 14 outputs one or more predetermined control parameters to the electrical bicycle components 16, 18, 20, 22 and 24 via the power line 35 based on the operations of the input devices 26, 28, 30, 32 and 34. In the event of a disruption of the electrical connecting state of one the power lines 36, 38, 40, 42 and 44 between the control unit 14 and one of the input devices 26, 28, 30, 32 and 34, the control unit 14 automatically outputs a predetermined control parameter to the electrical bicycle components 16, 18, 20 via the power line 35.

The main microcomputer 60 includes control circuits with one or more CPUs, storage units, computation units and the like. The main microcomputer 60 also includes software that outputs the predetermined control parameters in accordance with adjustment signals outputted from the input devices 26, 28, 30, 32 and 34. In particular, using the signal processing section 62, the main microcomputer 60 outputs predetermined control parameters output based on the operation of the input devices 26, 28, 30, 32 and 34 to control the electrical bicycle components 16, 18, 20, 22 and 24 in accordance with adjustment signals outputted from the input devices 26, 28, 30, 32 and 34. The main microcomputer 60 forms part of a bicycle adjusting controller together with other microcomputers of the electrical bicycle components 16, 18, 20, 22 and 24 as explained below.

The signal processing section 62 constitutes a detecting member detects an electrical connecting state between the control unit 14 and each of the input devices 26, 28, 30, 32 and 34. The signal processing section 62 (i.e., the detecting member) can be integrated into the main microcomputer 60 or a separate component as needed and/or desired. When using a power line communication (PLC) system, the signal processing section 62 (i.e., the detecting member) outputs a predetermined control parameter when a signal from the manually input member is not received after a prescribed time interval. In other words, the input devices 26, 28, 30, 32 and 34 periodical send a signal to the signal processing section 62 (i.e., the detecting member) of the control unit 14. When that periodical signal is no longer detected from one of the input devices 26, 28, 30, 32 and 34 for a period of time that is greater than the prescribed time interval, then the control unit 14 determines that the input device is detached or otherwise not communicating (e.g., damaged) with the control unit 14.

Figure 5:
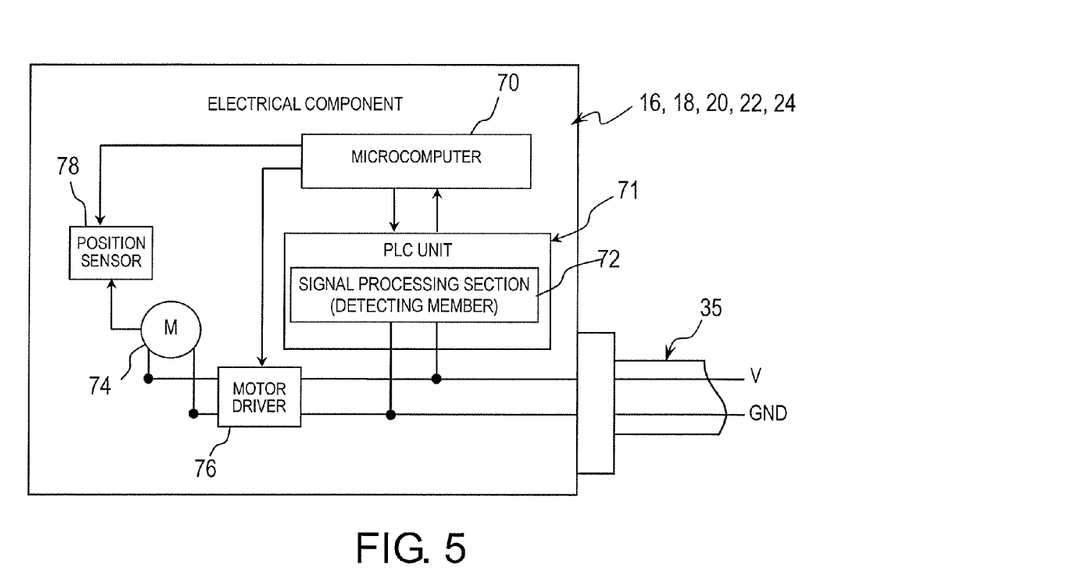
FIG. 5 is a schematic block diagram showing a basic configuration of each of the electrical components of the bicycle component control apparatus.

Turning now to FIG. 5, the basic configuration of the controlling part of each of the electrical bicycle components 16, 18, 20, 22 and 24 will now be discussed. The mechanical structures of the electrical bicycle components 16, 18, 20, 22 and 24 are well known in the bicycle field. For this reason, the mechanical structures of the electrical bicycle components 16, 18, 20, 22 and 24 are not illustrated and/or discussed in detail herein. Each of the electrical bicycle components 16, 18, 20, 22 and 24 is basically provided with a sub-microcomputer 70 and a power line communication (PLC) unit 71 that includes a signal processing section 72.

The power line communication unit 71 is connected to the power supply 25 for receiving electric power. The sub-microcomputer 70 includes control circuits with one or more CPUs, storage units, computation units and the like. The sub-microcomputer 70 also includes software that outputs predetermined control parameters in accordance with adjustment signals outputted from the control unit 14. In particular, using the signal processing section 72, the sub-microcomputer 70 also operates the corresponding one of the electrical bicycle components 16, 18, 20, 22 and 24 in accordance with adjustment signals outputted from the corresponding one of the input devices 26, 28, 30, 32 and 34. The sub-microcomputers 70 together with the main microcomputer 60 form the bicycle adjusting controller. It will be understood from this disclosure that the main microcomputer 60 can be eliminated such that the input devices 26, 28, 30, 32 and 34 directly communicate with the electrical bicycle components 16, 18, 20, 22 and 24 as needed and/or desired. If the main microcomputer 60 is eliminated, the signal processing section 72 for each electrical bicycle component constitutes a detecting member detects an electrical connecting state between its sub-microcomputer and its input device. The signal processing section 72 can be integrated into the sub-microcomputer 70 or a separate component as needed and/or desired.

Still referring to FIG. 5, each of the electrical bicycle components 16, 18, 20, 22 and 24 is also provided with an actuator 74, an actuator driver 76 and a position sensor 78. The actuator 74 is a reversible motor that is configured and arranged to drive a valve, a like or the like of the electrical bicycle component. While the actuator 74 is illustrated as a motor in the illustrated embodiments, the actuator 74 can be other types of devices such as a solenoid. The actuator 74 adjust the position of a part to set a state of the electrical bicycle component, e.g., a lockout state, a damping rate state, a travel-stroke length state, a gear position, a seatpost height position state etc. The actuator driver 76 drives the actuator 74 in response to control signals from the sub-microcomputer 70. The actuator driver 76 includes motor drivers and deceleration units for driving and decelerating the rotation of the actuator 74. The position sensor 78 detects the position of the actuator 74 or other part of the electrical bicycle component that is indicative its current setting position or state. The sub-microcomputer 70 is configured and arranged to control the actuator driver 76 in response to an adjustment signal from the input device for that electrical bicycle component via the control unit 14. The sub-microcomputer 70 includes software that controls the actuator 74 in accordance with adjustment signals outputted from the input device for that electrical bicycle component via the control unit 14.

Figure 6:
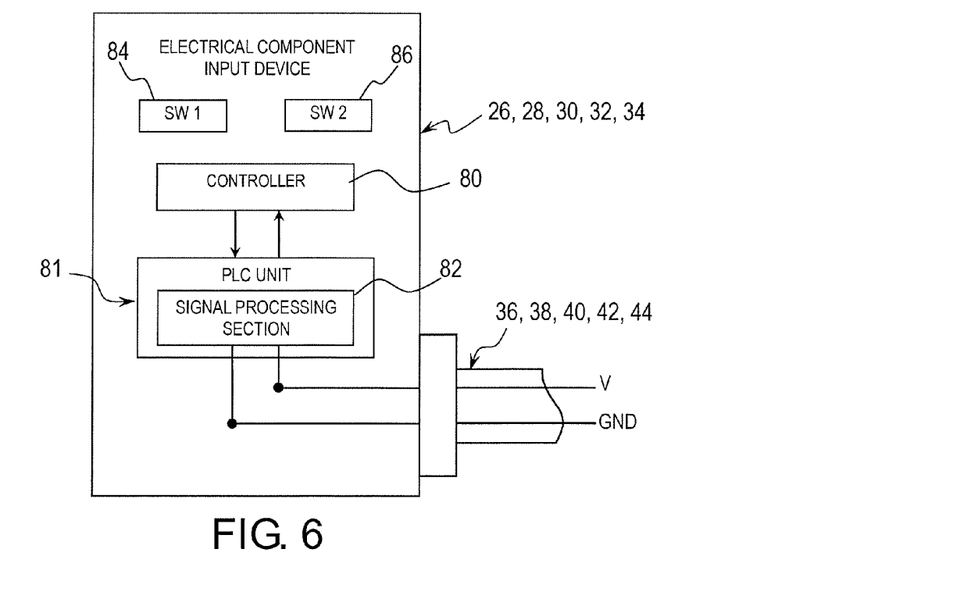
FIG. 6 is a schematic block diagram showing a basic configuration of each of the input devices of the bicycle component control apparatus.

Turning now to FIG. 6, the basic configuration of the controlling part of each of the input devices 26, 28, 30, 32 and 34 will now be discussed. The mechanical structures of the input devices 26, 28, 30, 32 and 34 are well known in the bicycle field. For this reason, the mechanical structures of the input devices 26, 28, 30, 32 and 34 are not illustrated and/or discussed in detail herein. Each of the input devices 26, 28, 30, 32 and 34 is basically provided with a controller 80 and a power line communication (PLC) unit 81 that includes a signal processing section 82. Each of the input devices 26, 28, 30, 32 and 34 is also provided with a pair of switches 84 and 86. The power line communication unit 81 is connected to the power supply 25 for receiving electric power. The signal processing section 82 can be integrated into the controller 80 or a separate component as needed and/or desired.

Figure 7:
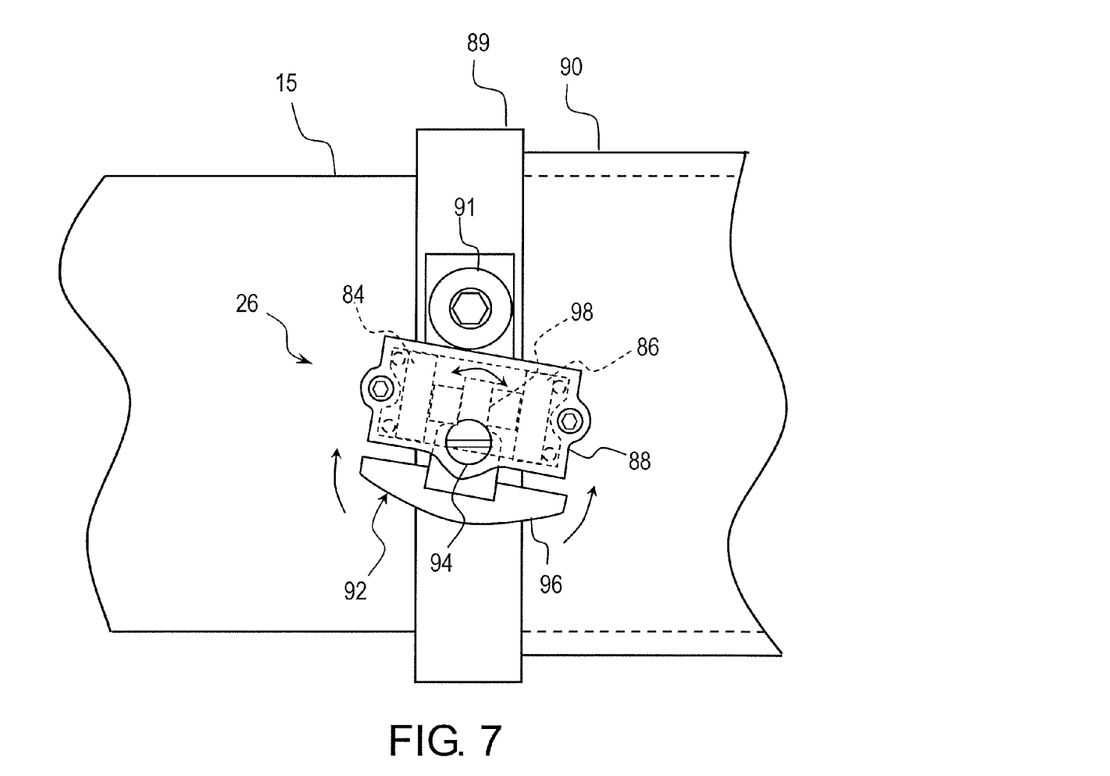
FIG. 7 is a bottom plan view of the front suspension input device for the bicycle component control apparatus.

The switches 84 and 86 can be any type of switches. Moreover, while each of the input devices 26, 28, 30, 32 and 34 is illustrated as including two switches, it will be apparent that more or less switches can be provided as needed and/or desired. One example of a user operated input device is illustrated in FIG. 7, which is used for the front suspension input device 26. The rear suspension input device 28 is a mirror image of the front suspension input device 26. As mentioned above, the input device 26 is not limited for use with the front suspension 16. Rather, it will be apparent from this disclosure that the input device 26 can be configured to operate one of the other electrical bicycle components 20, 22 and 24. For example, the input device 26 can be used to operate the front derailleur 20, the rear derailleur 22 or the seatpost 24 as needed and/or desired. The front suspension input device 26 basically includes the switches 84 and 86, which are mounted in a housing 88. The housing 88 is attached to a band clamp 89 of a grip 90 by a bolt 91. The grip 90 is a lock on type grip. The band clamp 89 is disposed on the one end of the grip 90. The band clamp 89 is fixed to the handlebar 15 by the bolt 91. A single operating member 92 is pivotally mounted to the housing 88 by a screw 94 for operating the switches 84 and 86. The operating member 92 includes an operating portion 96 and a contact portion 98. The screw 98 is disposed between the operating portion 96 and the contact portion 98 as well as between the switches 84 and 86. When the operating portion 96 is operated in a first rotational direction, the switch 84 is pushed by the contact portion 98. When the operating portion 96 is operated a second rotational direction, which is opposite the first rotational direction, the switch 86 is pushed by the contact portion 98. When the operating portion 96 is not operated, the contact portion 98 is in center position. The angle of the housing 88 relative to the handlebar 15 is adjustable by rotating the housing 88 around the axis of the bolt 91 while the bolt 91 is loose and then tightening the bolt 91 when the housing 88 is in the desired orientation relative to the handlebar 15.

In this first illustrated embodiment of FIGS. 3 to 7, the bicycle adjusting controller of the bicycle component control apparatus 12 is made of a plurality of microcomputers with a power line communication (PLC) system interconnecting the electrical bicycle components and the input devices. It will be apparent from this disclosure that other configurations can be used for interconnecting the electrical bicycle components and the input devices. For example, the control unit 14 could be eliminated and/or wireless communications can be used as explained below.

Figure 8:
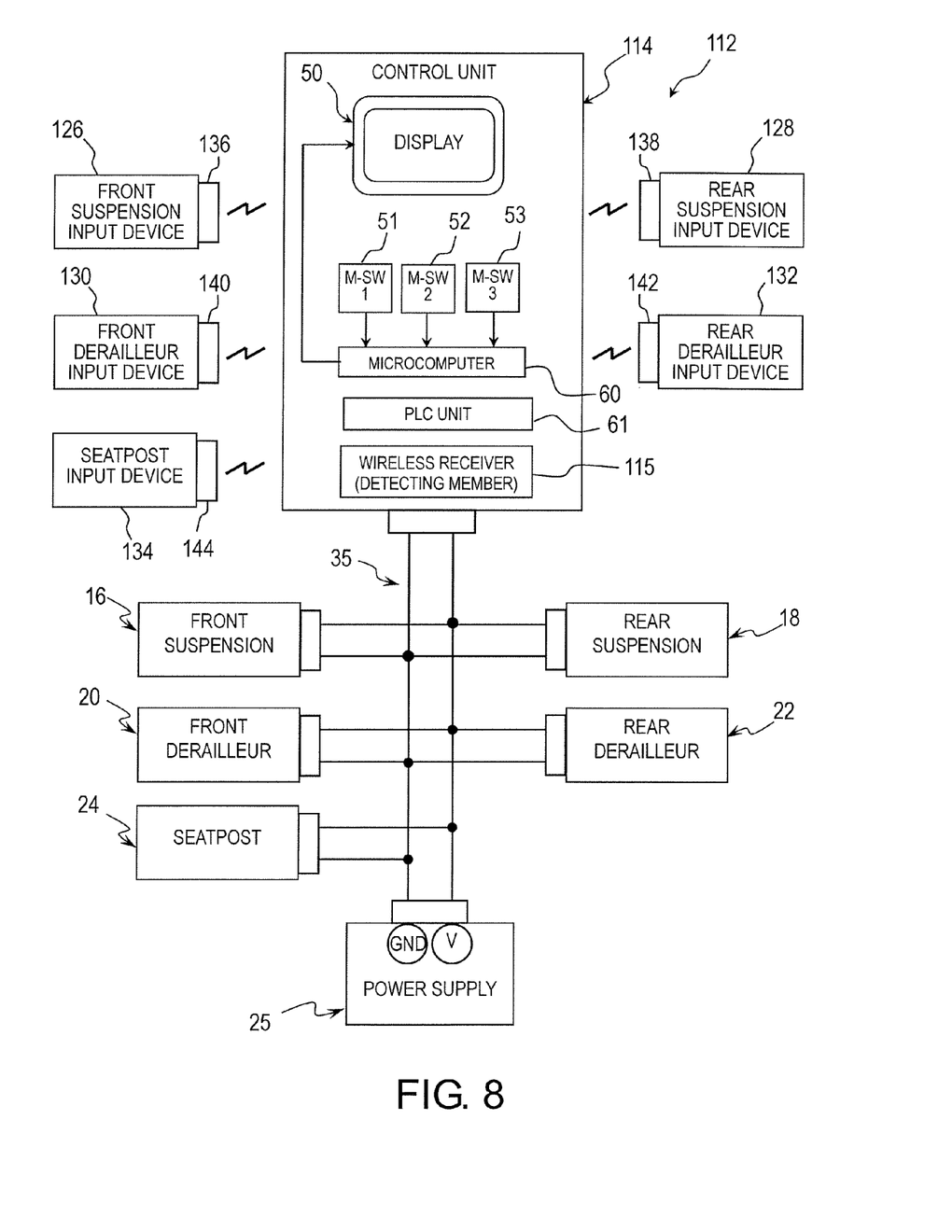
FIG. 8 is an alternative schematic block diagram showing an entire configuration of an alternative bicycle component control apparatus.

Referring now to FIG. 8, a schematic block diagram is illustrated that shows a basic configuration of a bicycle component control apparatus 112 that is provided with a control unit 114 for controlling the electrical bicycle components 16, 18, 20, 22 and 24 in response to manual inputs of input devices 126, 128, 130, 132 and 134, respectively. The parts of the control unit 114 that are identical to the parts of the first embodiment will be given the same reference numbers that are used in describing the first embodiment. Here, the control unit 114 is identical to the control unit 14, except that the control unit 114 includes a wireless receiver 115 for wireless communicating with the input devices 126, 128, 130, 132 and 134 instead of via the power lines.

Also, the input devices 126, 128, 130, 132 and 134 are identical to the input devices 26, 28, 30, 32 and 34, except that the input devices 126, 128, 130, 132 and 134 includes transmitters 136, 138, 140, 142 and 144, respectively, instead of using power line communication unit. The transmitters 136, 138, 140, 142 and 144, wirelessly send command signals to the wireless receiver 115 of the control unit 114 in response to manual operation of the input devices 126, 128, 130, 132 and 134. Each of the input devices 126, 128, 130, 132 and 134 includes a battery for supply power to the transmitters 136, 138, 140, 142 and 144.

In the first illustrated embodiment, the electrical connecting state refers to whether the input device 26, 28, 30, 32 or 34 is detached from the control unit 14. However, the electrical connecting state is not limited to a connection made by one or more wires. Rather, as in the embodiment of FIG. 8, the phrase the electrical connecting state as used herein also includes a wireless connection. Thus, in the case of a wireless communication system, the electrical connecting state refers to whether the wireless communications are sent and communicated between two devices as designed (i.e., a normal state) or whether the wireless communications interrupted (i.e., a non-normal state).

As seen in FIG. 8, the control unit 114 is electrically coupled to the electrical bicycle components 16, 18, 20, 22 and 24 by the power line 35 in the same manner as in the first embodiment. Of course, the control unit 114 and the electrical bicycle components 16, 18, 20, 22 and 24 can be configured to wireless communicate with each other. Alternatively, the control unit 114 can be eliminated, and the input devices 126, 128, 130, 132 and 134 and the electrical bicycle components 16, 18, 20, 22 and 24 can be configured with a wireless receiver to wireless communicate with each other. In any event, the control unit 114 outputs a predetermined control parameter to the electrical bicycle components 16, 18, 20, 22 and 24 when the wireless receiver 115 (i.e., the detecting member) detects a loss of communication (i.e., electrical connecting state) between the control unit 114 and the corresponding input device. Thus, in this embodiment, the loss of communication (i.e., electrical connecting state) indicates a non-normal state of the input device. A non-normal state can occur in an input device, for example, when a battery in the input device discharges.

Referring now to FIG. 9, a schematic block diagram is illustrated that shows a basic configuration of a bicycle component control apparatus 212 that is provided with a control unit 214 for controlling electrical bicycle components 216, 218, 220, 222 and 224 in response to manual inputs of input devices 226, 228, 230, 232 and 234, respectively. The electrical bicycle components 216, 218, 220, 222 and 224 are identical to the electrical bicycle components 16, 18, 20, 22 and 24, respectively, except that each of the electrical bicycle components 216, 218, 220, 222 and 224 just has a microcomputer instead of a power line communication unit.

The parts of the control unit 214 that are identical to the parts of the first embodiment will be given the same reference numbers that are used in describing the first embodiment. Here, the control unit 214 is identical to the control unit 14, except that the control unit 214 includes dedicated signal wires POS and a power (voltage) supply sensor 258 instead of using the power lines to communicate for communicating with the input devices 226, 228, 230, 232 and 234 and the electrical bicycle components 216, 218, 220, 222 and 224. In other words, the control unit 214 is connected to the input devices 226, 228, 230, 232 and 234 by power lines 236, 238, 240, 242 and 244, respectively, which each includes at least one dedicated signal wire POS in addition to the ground line and the voltage line. The control unit 214 is connected to the electrical bicycle components 216, 218, 220, 222 and 224 by power line 235, which includes two signal wires for controlling the electrical bicycle components 216, 218, 220, 222 and 224 and in addition to the ground line and the voltage line that supply power from the power supply 25 to the control unit 214 and the electrical bicycle components 216, 218, 220, 222 and 224. Thus, in this embodiment, the power supply sensor 258 (i.e., the detecting member) detects electrical connecting states between the control unit 214 and the input devices 226, 228, 230, 232 and 234. Thus, in this embodiment, the loss of power (i.e., electrical connecting state) to an input device indicates a non-normal state of the input device. A non-normal state can occur in an input device, for example, when one of the power lines 236, 238, 240, 242 and 244 becomes detached. In this way, the power supply sensor 258 (i.e., the detecting member) outputs a predetermined control parameter when the power supply sensor 258 (i.e., the detecting member) detects the electric power not being supplied to the input device.

Figure 10:
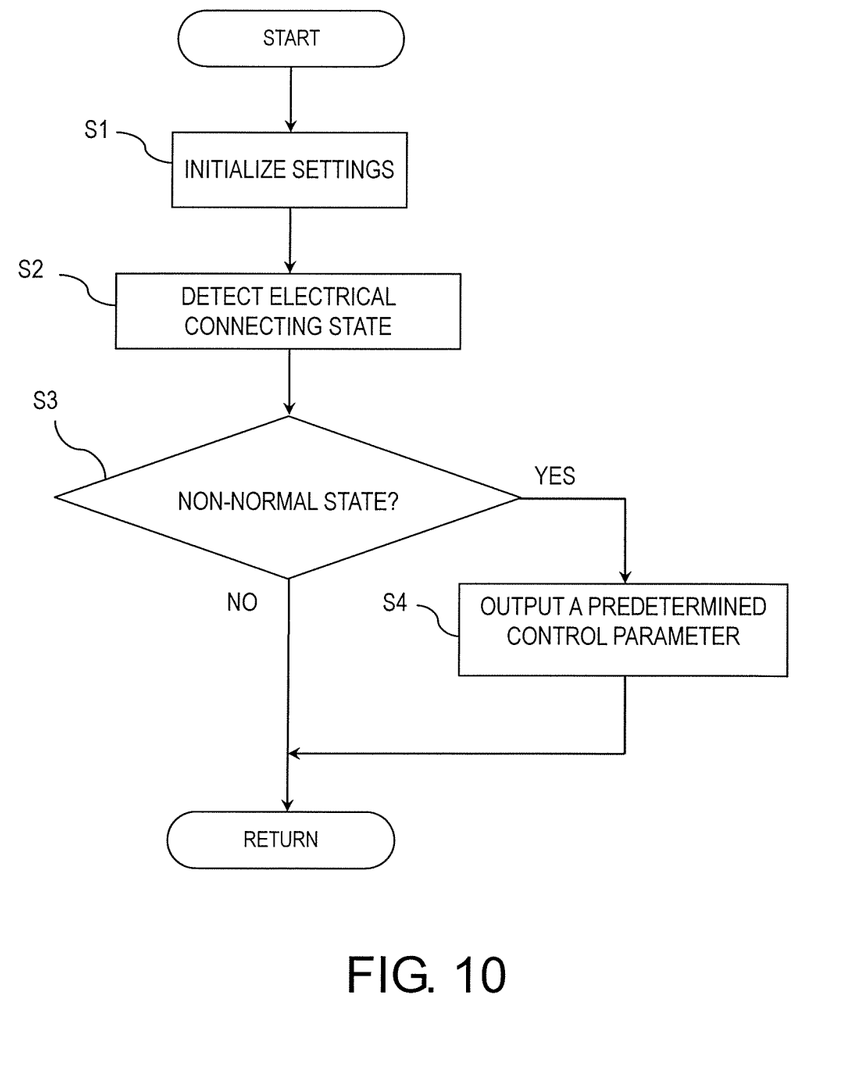
FIG. 10 is a flowchart showing a first control process executed by the controller of the bicycle component control apparatus.

Turning now to the flow chart of FIG. 10, in each of the above mentioned embodiments, the bicycle adjusting controller (i.e., the microcomputer 60 and/or the sub-microcomputers 70) conducts the process on a continuous basis every at prescribed time intervals once the control unit 14 is turned "on" which results in power being supplied to the input devices and the electrical bicycle components connected to the power supply 25.

In step S1, the all of the previous detected values and/or flags are cleared from memory. Then the process proceeds to step S2.

In step S2, the detecting member detects the electrical connecting state of each of the input devices. For example, in the first embodiment, either the signal processing section 72 or the signal processing section 82, or both detects the electrical connecting state of each of the input devices with the bicycle adjusting controller. As mentioned above, the detection of the electrical connecting state of the input devices with the bicycle adjusting controller (i.e., the microcomputer 60 and the sub-microcomputer 70) can be done either by the signal processing section 82 at each of the electrical bicycle components or by the signal processing section 72 at the control unit 14. In the case of the wireless input devices of FIG. 8, the wireless receiver 115 detects the electrical connecting state of each of the input devices. In the case of embodiment of FIG. 9, the power supply sensor 258 detects the electrical connecting state of each of the input devices. Then the process proceeds to step S3.

In step S3, the bicycle adjusting controller then determines if the electrical connecting state of any one of the input devices is disrupted such that a non-normal state exists. If the non-normal state exists, then the process proceeds to step S4.

In step S4, the bicycle adjusting controller output a predetermined control parameter for changing of the electrical bicycle component(s) in which the manual input signal or command cannot be received by the electrical bicycle component(s).

However, in step S3, if the bicycle adjusting controller determines the electrical connecting states of all of the input devices are in a normal state, then the process returns to the beginning to start again at the next prescribed time interval.

Moreover, the bicycle suspension control apparatus is not limited to illustrated configurations. For example, the bicycle suspension control apparatus can be configured such that the power sensor 62 is disposed on the power supply 25. Also the bicycle suspension control apparatus can be configured such that a microcomputer (not shown) is provided in the power supply 25 with the microcomputer (not shown) of the power supply 25 forming a part of the bicycle adjusting controller. In such a case, the bicycle suspension control apparatus can be further configured such that the microcomputer 60 and at least of the microcomputer 70 and/or the microcomputer (not shown) of the power supply 20 can be combined together.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component control apparatus comprising:
    a controller configured to control an operation of an electrical bicycle component by selectively outputting a control parameter; and
    a detecting member that detects an electrical connecting state between the controller and a manually operated input member for changing a setting of the electrical bicycle component,
    the controller outputting a predetermined control parameter to the electrical bicycle component to change the setting of the electrical bicycle component in response to a detection by the detecting member of the electrical connecting state.

2. The bicycle component control apparatus according to claim 1, wherein
    the controller outputs a predetermined control parameter when the electrical connecting state indicates a non-normal state.

3. The bicycle component control apparatus according to claim 1, wherein
    the detecting member outputs a predetermined control parameter when a signal from the manually input member is not received.

4. The bicycle component control apparatus according to claim 1, wherein
    the detecting member outputs a predetermined control parameter when the detecting member detects the electric power is not supplied to the input member.

5. The bicycle component control apparatus according to claim 1, wherein
the controller is disposed on the electrical bicycle component.

6. The bicycle component con of apparatus according to claim 1, wherein
the controller is disposed separate and remote from the electrical bicycle component.

7. The bicycle component control apparatus according to claim 1, wherein
the controller is connected to the manually operated input member by a wire.

8. The bicycle component control apparatus according to claim 1 further comprising
a power line communication unit connected to the manually operated input member by a wire.

9. The bicycle component control apparatus according to claim 1, further comprising
a wireless receiver that receives a signal from a wireless transmitter of the manually operated input member.

10. The bicycle component control apparatus according to claim 1, wherein
the controller is configured to set a non-lock out state of a bicycle suspension as the predetermined control parameter, with the bicycle suspension being the electrical bicycle component being controlled by selectively outputting the control parameter.

11. The bicycle component control apparatus according to claim 1, wherein
the controller is configured to set a middle speed stage of a bicycle derailleur as the predetermined control parameter, with the bicycle derailleur being the electrical bicycle component being controlled by selectively outputting the control parameter.

12. The bicycle component control apparatus according to claim 1, wherein
the controller is configured to set a middle seat position of a bicycle sea post as the predetermined control parameter, with the bicycle seat post being the electrical bicycle component being controlled by selectively outputting the control parameter.

13. A bicycle component control apparatus comprising:

an electrical bicycle component;

a controller configured to control an operation of an electrical bicycle component by selectively outputting a control parameter;

a manually operated input member operatively coupled to the controller such that the manually operated input member selectively outputs an input signal to the controller to change a setting of the electrical bicycle component in accordance with the control parameter; and a detecting member that detects an electrical connecting state between the controller and the manually operated input member, the controller outputting a predetermined control parameter to the electrical bicycle component to change the setting of the electrical bicycle component in response to a detection by the detecting member of the electrical connecting state.

\* \* \* \* \*